(12) United States Patent
Belcher (10) Patent No.: US 11,148,408 B2
(45) Date of Patent: Oct. 19, 2021

(54) METHOD FOR PLASMA TREATING SUBSTRATES AND FOR BONDING PLASMA TREATED SUBSTRATES

(71) Applicant: The Boeing Company, Chicago, IL (US)

(72) Inventor: Marcus Anthony Belcher, Sammamish, WA (US)

(73) Assignee: The Boeing Company, Chicago, IL (US)

( * ) Notice: Subject to any disclaimer, the term of this patent is extended or adjusted under 35 U.S.C. 154(b) by 344 days.

(21) Appl. No.: 16/437,306

(22) Filed: Jun. 11, 2019

(65) Prior Publication Data
US 2020/0391496 A1    Dec. 17, 2020

(51) Int. Cl.
| | | |
|---|---|---|
| *B32B 27/00* | (2006.01) | |
| *B32B 37/00* | (2006.01) | |
| *B32B 38/00* | (2006.01) | |
| *B32B 37/18* | (2006.01) | |
| *B32B 27/28* | (2006.01) | |
| *B32B 27/08* | (2006.01) | |

(52) U.S. Cl.
CPC .......... *B32B 38/0008* (2013.01); *B32B 27/08* (2013.01); *B32B 27/285* (2013.01); *B32B 37/182* (2013.01); *B32B 2371/00* (2013.01)

(58) Field of Classification Search
CPC ......... B32B 27/00; B32B 27/08; B32B 27/20; B32B 27/28; B32B 27/285; B32B 37/00; B32B 37/10; B32B 37/18; B32B 37/182; B32B 38/00; B32B 38/0008
See application file for complete search history.

(56) References Cited

U.S. PATENT DOCUMENTS

| | | | | |
|---|---|---|---|---|
| 7,157,717 B2* | 1/2007 | Shelley | ................... | G01J 3/443 250/372 |
| 8,342,017 B1* | 1/2013 | Bossi | ..................... | G01N 19/04 73/150 A |

OTHER PUBLICATIONS

The Plasma Treatment of Thermoplastic Fibre Composites for Adhesive Bonding: https://www.sciencedirect.com/science/article/pii/S0010436194800030.
Atmospheric Plasma Treatment of Composites: http://www.intrfacetech.com/atmospheric-plasmatreatment-of-composites/.
ASTM International, Standard Practice for Classifying Failure Modes in Fiber-Reinforced-Plastic (FRP) Joints, D 5573-99 (Reapproved 2005), May 9, 2005, 1-3, West Conshohocken, PA.

* cited by examiner

*Primary Examiner* — Jacob T Minskey
*Assistant Examiner* — Matthew Hoover
(74) *Attorney, Agent, or Firm* — von Briesen & Roper, s.c.

(57) ABSTRACT

A method for plasma treating a surface of a first substrate is disclosed. The method may comprise generating a plasma flume using a plasma treatment device having a nozzle. The plasma flume may emanate through a flume aperture of the nozzle at an emanation angle of about 5 degrees or less. The emanation angle may be defined as an angle between a central axis of the nozzle and a central axis of the flume aperture. The method may further comprise plasma treating the surface of the first substrate with the plasma flume by scanning the plasma flume over the surface of the first substrate. The first substrate may be one of a consolidated thermoplastic material and a cured thermoset material.

20 Claims, 5 Drawing Sheets

METHOD FOR PLASMA TREATING SUBSTRATES AND FOR BONDING PLASMA TREATED SUBSTRATES

FIELD

The present disclosure generally relates to methods for plasma treating substrate surfaces, and for bonding the plasma treated substrate surfaces.

BACKGROUND

Many applications require bonding of two materials. However, certain materials with low surface energies, such as thermoplastic materials, may be inherently difficult to bond.

SUMMARY

In accordance with one aspect of the present disclosure, a method for plasma treating a surface of a first substrate is disclosed. The method may comprise generating a plasma flume using a plasma treatment device having a nozzle. The plasma flume may emanate through a flume aperture of the nozzle at an emanation angle. The emanation angle may be defined as an angle between a central axis of the nozzle and a central axis of the flume aperture. The emanation angle of the nozzle may be about 5 degrees or less. The method may further comprise plasma treating the surface of the first substrate with the plasma flume by scanning the plasma flume over the surface of the first substrate. The first substrate may be one of a consolidated thermoplastic material and a cured thermoset material.

In accordance with another aspect of the present disclosure, a method for bonding a first substrate to a second substrate is disclosed. The method may comprise generating a plasma flume using a plasma treatment device having a nozzle. The plasma flume may emanate through a flume aperture of the nozzle at an emanation angle. The emanation angle may be defined as an angle between a central axis of the nozzle and a central axis of the flume aperture. The emanation angle may be about 5 degrees or less. The method may further comprise plasma treating a bonding surface of the first substrate by scanning the plasma flume over the bonding surface of the first substrate. The plasma treatment may increase the propensity for bonding of the plasma treated surface relative to the surface prior to plasma treating. The method may further comprise applying an adhesive to the plasma treated bonding surface of the first substrate, placing a bonding surface of the second substrate in contact with the adhesive applied to the first substrate, and curing the adhesive to bond the first substrate to the second substrate.

In accordance with another aspect of the present disclosure, a method for forming a composite structure is disclosed. The method may comprise generating a plasma flume through a flume aperture of a nozzle at an emanation angle being defined as an angle between a central axis of the nozzle and a central axis of the flume aperture. The emanation angle may be about 5 degrees or less. The method may further comprise plasma treating a bonding surface of a first substrate with the plasma flume by scanning the plasma flume over the bonding surface of the first substrate, and plasma treating a bonding surface of a second substrate with the plasma flume by scanning the plasma flume over the bonding surface of the second substrate. The method may further comprise bonding the plasma treated bonding surfaces of the first and second substrates together to form the composite structure.

The features, functions, and advantages that have been discussed can be achieved independently in various embodiments or may be combined in yet other embodiments, further details of which can be seen with reference to the following description and drawings.

The drawings are not necessarily drawn to scale and the disclosed embodiments may be, at least in part, illustrated schematically. Also, the following detailed description is merely exemplary in nature and is not intended to limit the invention or the application and uses thereof. Hence, although the present disclosure is, for convenience of explanation, depicted and described with regard to certain illustrative embodiments, it will be appreciated that the disclosure can be implemented in various other embodiments and in various other systems and environments.

DETAILED DESCRIPTION

Figure 1:
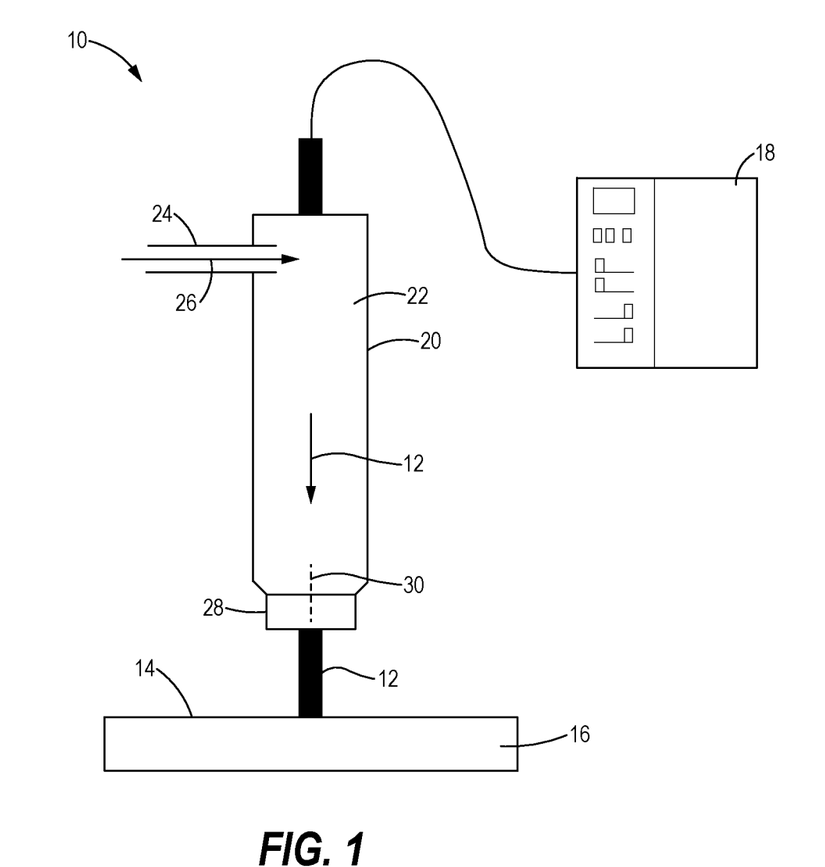
FIG. 1 is a schematic representation of a plasma treatment device, in accordance with the present disclosure.

Referring now to the drawings, and with specific reference to FIG. 1, an atmospheric pressure plasma treatment device 10 is shown. The plasma treatment device 10 produces a plasma flume 12 (or an ionized gas) from compressed air for treating a surface 14 of a first substrate 16. Although the first substrate 16 is depicted as a flat structure in FIG. 1, it will be understood that the substrate 16 may have more complex (e.g. curved) geometries in practice. Plasma treatment of the surface 14 with the plasma flume 12 may modify and/or clean the surface 14 to improve bonding of the substrate 16 to applied substances such as adhesives, coatings, inks, or other materials. Specifically, the plasma flume 16 contains charged species that may remove microscopic surface contaminants and/or modify the surface 14 with chemical groups (e.g. oxygen functionality) that enhance bonding with applied materials (adhesives, coatings, inks, etc.). The plasma treatment may increase the surface energy of the surface 14, thereby increasing the propensity of the surface for bonding relative to the surface prior to plasma treatment.

The plasma treatment device 10 may be operated manually or robotically, such as with a robotic gantry system. As shown in FIG. 1, the plasma treatment device 10 includes a plasma generator 18 connected to a plasma jet 20. Among other features, the plasma jet 20 includes a chamber 22, one or more inlets 24 for compressed air 26, and a nozzle 28. The nozzle 28 may be removed from the device 10 and replaced with other nozzles having other configurations to achieve desired effects on the plasma flume 12. Upon excitation with electrical power from the plasma generator 18, compressed air 26 within the chamber 22 is ionized to produce the plasma flume 12. The plasma flume 12 is expelled from the chamber 22 and through the nozzle 28, and impinges on the surface 14 normal to the surface 14 for treatment thereof. Additionally, the plasma flume 12 emanates from the nozzle 20 at an emanation angle that is controlled by the configuration of the nozzle 28. As explained further below, the emanation angle is an angle of deflection between the plasma flume 12 and a central axis 30 of the nozzle 28.

The emanation angle of the nozzle 28 is about 5 degrees (±0.2%) or less. The low emanation angle of the nozzle 28 provides a more intense and focused (less diffuse) plasma flume relative to nozzles with greater emanation angles. The more intense and focused plasma flume provided with the nozzle 28 increases the bonding propensity of substrate surfaces at reduced treatment times compared to nozzles with higher emanation angles. Even materials that are typically difficult to bond due to their low surface energies, such as thermoplastic materials, may exhibit bonding enhancements at reduced treatment times using the nozzle 28.

In one arrangement, the substrate 16 treated by the plasma treatment device 10 is a thermoplastic material. The thermoplastic material may be consolidated and/or hardened with heat and pressure prior to treatment with the plasma flume 12. Thermoplastic materials that may exhibit increased bonding propensities with plasma treatment in accordance with the present disclosure include, but are not limited to, polyphenylene sulfide, polyaryletherketone (PAEK), polyetherketoneketone (PEKK), polyetheretherketone (PEEK), polyimide, polyetherimide, polyamide, polyamide-imide, polyester, polybutadiene, polyurethane, polypropylene, polysulfone, polyethersulfone, polyphenylsulfone, polyacrylamide, polyketone, polyphthalamide, polyphenylene ether, polybutylene terephthalate, polyethylene, polyethylene terephthalate, polyester-polyarylate (e.g. Vectran®), polytetrafluoroethylene (PTFE), and other thermoplastic resins.

Alternatively, the substrate 16 treated by the plasma treatment device 10 is a thermoset material. The thermoset material may be cured and/or hardened with heat and pressure prior to treatment with the plasma treatment device 10. Examples of suitable thermoset materials include, but are not limited to, epoxy resins, cyanate esters, benzoxazines, polyimides, bismaleimides, vinyl esters, polyurethanes, polyureas, polyurethane/polyurea blends, polyesters, and other thermoset resins. The substrate 16 may be formed from or include other materials such as, but not limited to, metal, ceramic, rubber, glass, and composite materials.

Optionally, the substrate 16 may be reinforced with a reinforcing material. Reinforcing materials may include, but are not limited to, carbon fiber, glass fiber, glass spheres, mineral fiber, or other reinforcing materials. If fibers are used as a reinforcing material, the fibers may be continuous or chopped, and may be unidirectional, randomly-oriented, or in the form of a weave such as, but not limited to, a plain weave, a crowfoot weave, a basket weave, and a twill weave.

Figure 2:
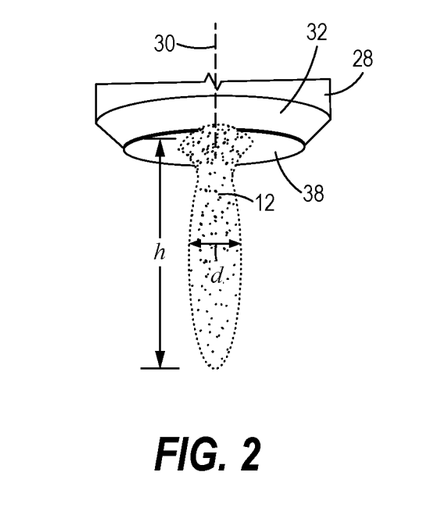
FIG. 2 is a perspective view of a nozzle of the plasma treatment device having an emanation angle of 0 degrees, in accordance with the present disclosure.
Figure 3:
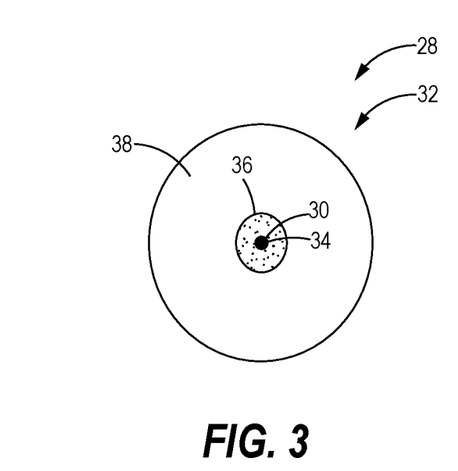
FIG. 3 is a bottom view illustrating a tip of the nozzle of FIG. 2, in accordance with the present disclosure.

In one arrangement, the nozzle 28 is a 0-degree nozzle 32 having an emanation angle of about 0 degrees (±0.2%), as shown in FIGS. 2-3. The emanation angle is defined as an angle between the nozzle central axis 30 and a central axis 34 of a flume aperture 36 through which the plasma flume 12 emanates at a tip 38 of the nozzle 32 (see FIG. 3). As such, the central axis 30 of the nozzle 32 and the central axis 34 of the flume aperture 36 may be aligned or at least parallel in the 0-degree nozzle 32.

Although nozzles having greater emanation angles are rotated in order to provide a more diffuse annular flume or plasma "cone" or "ring," the 0-degree nozzle 32 is generally not rotated during plasma treatment. Due to the low emanation angle, the 0-degree nozzle 32 may provide a more focused and intense plasma flume for impingement on the substrate surface 14 at a given orientation, such as a normal orientation, as compared to nozzles having greater emanation angles. The diameter (d) of the plasma flume 12 emanating from the 0-degree nozzle 32 may be about 6.4 millimeters (±2%), with it being understood that the exterior or outer edge of the plasma flume 12 is fluid and variable in practice. Accordingly, the diameter (d) of the plasma flume disclosed herein is approximate but generally constant as it is generated by the plasma device 10. Additionally, the plasma flume 12 may have a height (h) ranging from about 1.2 centimeters to about 2.0 centimeters. As such, the distance between the tip 38 of the nozzle 32 and the substrate surface 14 during plasma treatment may range from about 1.2 centimeters to about 2.0 centimeters during the plasma treatment process. In contrast, a 17-degree nozzle, which has an emanation angle of 17 degrees and rotates (typically at about 2800 rpm) during plasma treatment, produces an annular flume with a plasma flume diameter of about 24 millimeters and a height of about 1.3 centimeters. The 0-degree nozzle 32 thus affords a greater working distance than the 17-degree nozzle, and provides a plasma flume that is about four times more focused than the wider (more diffuse) annular plasma flume of the 17-degree nozzle. The greater working distance may facilitate processing of substrates with complex geometries. Depending on the configuration of the 0-degree nozzle 32 and/or other factors, the diameter (d) and height (h) of the plasma flume may deviate from the values provided above.

The intense plasma flume 12 generated by the 0-degree nozzle 32 may substantially reduce plasma treatment times needed for increasing bonding propensities of substrate surfaces compared to nozzles having emanation angles greater than 5 degrees. For instance, it has been found that identically-sized thermoplastic panels can be processed by plasma treatment about three times faster with the 0-degree nozzle 32 relative to a 17-degree nozzle, while providing comparable bonding strengths with an epoxy thermoset material using an epoxy adhesive. The resulting composite materials fabricated using the 0-degree nozzle 32, and a 17-degree nozzle, showed essentially identical mechanical performance in terms of fracture toughness (see Examples).

Figure 4:
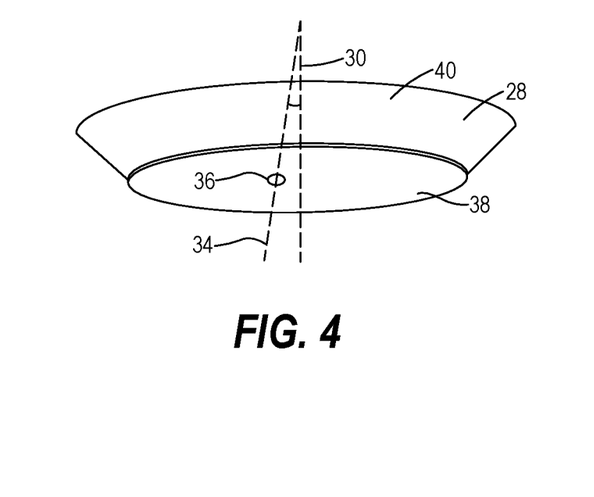
FIG. 4 is a perspective view of the nozzle similar to FIG. 2, but with the nozzle having an emanation angle of 2 degrees and the plasma flume being removed for clarity, in accordance with the present disclosure.
Figure 5:
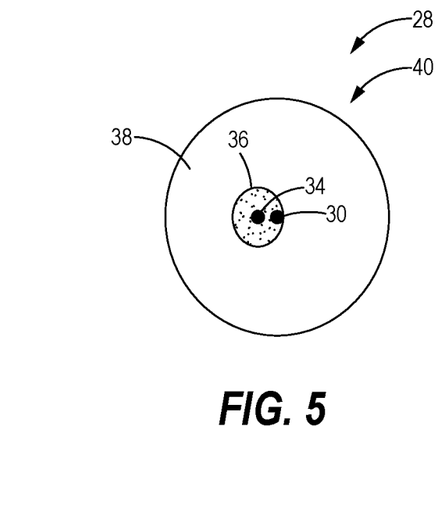
FIG. 5 is a bottom view illustrating a tip of the nozzle of FIG. 4, in accordance with the present disclosure.

In an alternative arrangement shown in FIGS. 4-5, a nozzle 28 is a 2-degree nozzle 40 having an emanation angle of about 2 degrees (±0.2%). In the 2-degree nozzle 40, the central axis 34 of the flume aperture 36 is at a 2 degree angle with respect to the nozzle central axis 30. The 2-degree nozzle 40 may rotate during plasma treatment to provide an annular plasma flume slightly wider and more diffuse than the plasma flume provided by the 0-degree nozzle 32. Nonetheless, the plasma flume provided by the 2-degree nozzle 40 is considerably more focused and intense than plasma flumes produced by nozzles with greater emanation angles. As such, similar to the 0-degree nozzle 32, the 2-degree nozzle 40 may allow shorter treatment times of substrates relative to nozzles with greater emanation angles.

Figure 6:
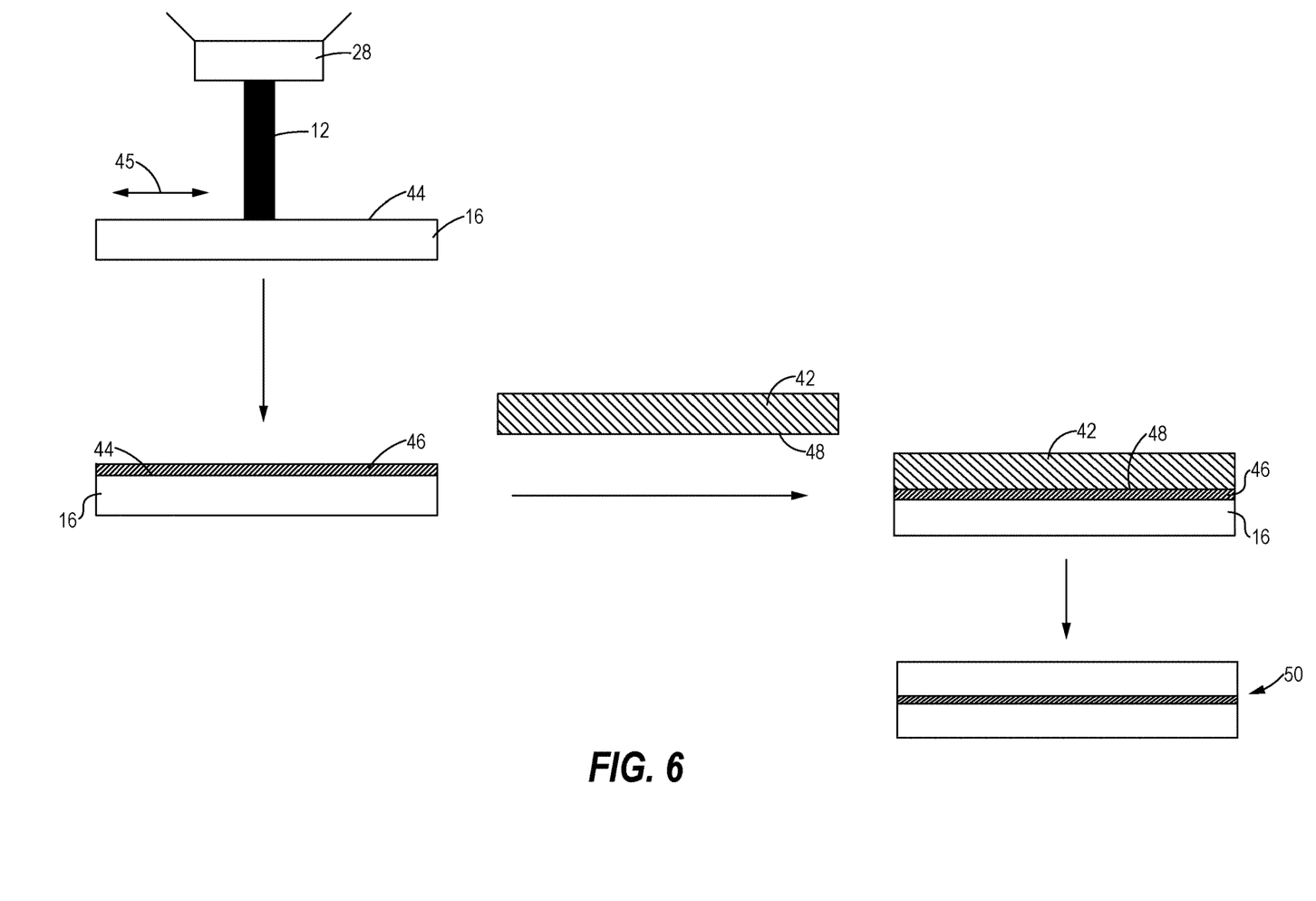
FIG. 6 is a schematic representation of a method of bonding first and second substrates using plasma treatment, in accordance with a method of the present disclosure.

Turning now to FIG. 6, a method of bonding the first substrate 16 and a second substrate 42 using the plasma treatment device 10 is shown. Initially, the plasma flume 12 is generated by the plasma delivery device 10 using the nozzle 28 having an emanation angle of about 5 degrees or less. For example, the nozzle 28 may be the non-rotating 0-degree nozzle 32, or the rotating 2-degree nozzle 40. Plasma treatment of a bonding surface 44 of the first substrate 16 is then carried out by scanning 45 the plasma flume 12 over the bonding surface 44 with the plasma flume 12, and/or the central axis thereof, being oriented normal to the bonding surface 44. The plasma treatment increases the propensity for bonding of the plasma treated bonding surface 44 relative to the surface prior to plasma treating. Subsequent to plasma treatment, an adhesive 46 is applied to the plasma treated bonding surface 44. The adhesive may be an epoxy adhesive or other suitable adhesives such as, but not limited to, acrylate and urethane adhesives. A bonding surface 48 of the second substrate 42 may be placed in contact with the applied adhesive 46. The adhesive 46 may then be cured to provide a composite structure 50 with the first substrate 16 bonded to the second substrate 42 via the adhesive 46.

In the method of FIG. 6, the first substrate 16 may be a consolidated thermoplastic material or a cured thermoset material. The second substrate 42 may be an uncured thermoset material, such as a thermoset prepreg material, which is cured concurrently with the adhesive 46. If the first substrate 16 is a consolidated thermoplastic material, the bonding surface 44 can be used as is without any solvent wiping to remove agents and contaminants prior to the plasma treatment, as the intense plasma flume 12 may perform the cleaning function of the solvent wiping. Furthermore, if the first substrate 16 is a cured thermoset material, the bonding surface 44 may be sufficiently activated for bonding by the plasma treatment alone without use of a peel ply given the intensity of the focused plasma flume 12.

Figure 7:
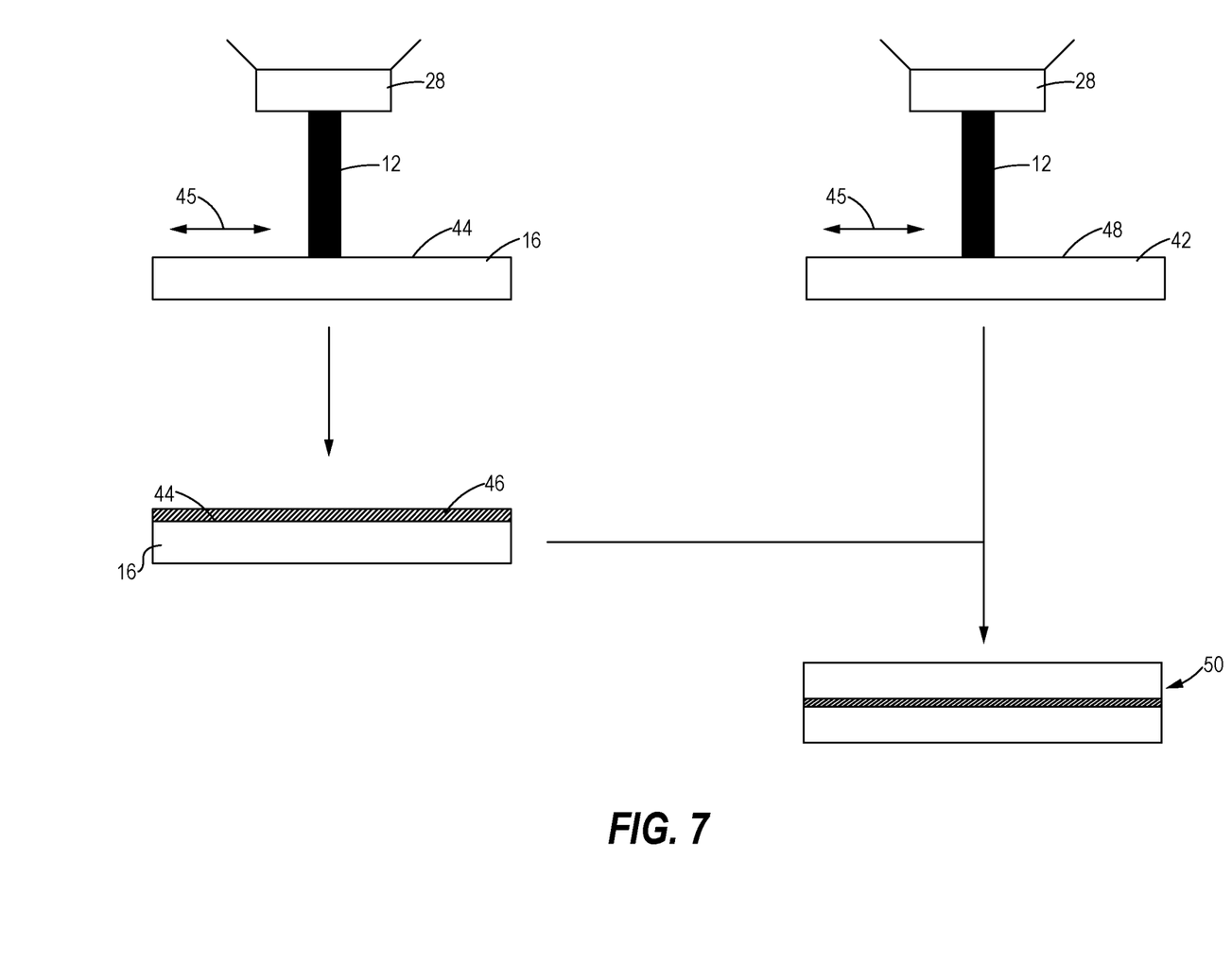
FIG. 7 is a schematic representation of a method of bonding first and second substrates using plasma treatment, in accordance with another method of the present disclosure.

Referring to FIG. 7, another method of bonding the first substrate 16 and the second substrate 42 is shown. The method of FIG. 7 is similar to the method of FIG. 6, except that the bonding surfaces 44 and 48 of both the first substrate 16 and the second substrate 42 are plasma treated to enhance their bonding propensities. The plasma treatment is carried out by separately scanning 45 the plasma flume 12 over the bonding surfaces 44 and 48 using the nozzle 28 (e.g. the 0-degree nozzle 32 or the 2-degree nozzle 40), with the plasma flume 12 being oriented normal to the bonding surfaces 44 and 48. The plasma treated bonding surfaces 44 and 48 are then bonded together to form the composite structure 50. Specifically, the adhesive 46 is applied to the plasma treated bonding surface 44 of the first substrate 16, and the plasma treated bonding surface 48 of the second substrate 42 is placed in contact with the adhesive 46 applied to the first substrate 16. The composite structure 50 is then formed by curing the adhesive 46. In the method of FIG. 7, the first substrate 16 and the second substrate 42 may be either a consolidated thermoplastic material or a cured thermoset material. If either of the first or second substrates 16 and 42 is a consolidated thermoplastic material, the surfaces 44 and 48 are plasma treated without solvent wiping beforehand, as the plasma treatment alone performs sufficient cleaning. If either of the first or second substrates 16 and 42 is a cured thermoset, the surfaces 44 and 48 are activated for bonding without use of a peel ply as the plasma treatment alone sufficiently activates the surfaces 44 and 48 for bonding.

Figure 8:
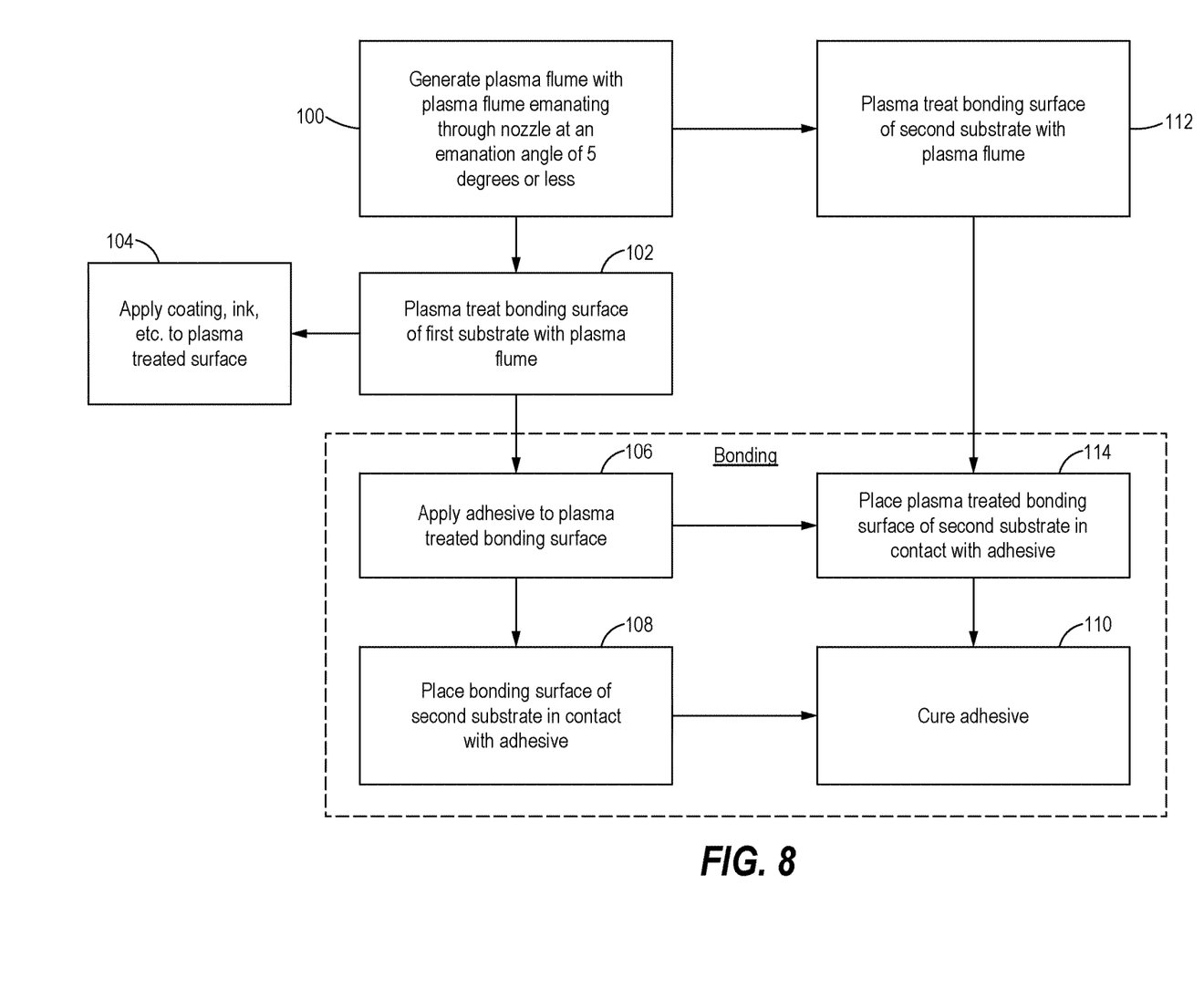
FIG. 8 is a flowchart illustrating a series of steps that may be involved in plasma treating a substrate bonding surface, and in bonding the plasma treated bonding surface to another component, in accordance with methods of the present disclosure.

FIG. 8 shows steps that may be involved in plasma treating a substrate bonding surface, and in bonding the plasma treated bonding surface to another component. At 100, the plasma flume 12 is generated with the plasma flume 12 emanating from the nozzle 28 at an emanation angle of 5 degrees or less. At 102, the bonding surface 44 of the first substrate 16 is plasma treated by scanning the plasma flume 12 over the bonding surface 44. At 104, after plasma treatment of the bonding surface 44, various coatings, inks, or other substances may be applied to the plasma treated bonding surface 44 with stronger adhesion to the bonding surface 44 relative to the untreated bonding surface.

Alternatively, the plasma treated bonding surface is bonded to the second substrate 42 by applying an adhesive 46 to the plasma treated bonding surface 44 (at 106), placing the bonding surface 48 of the second substrate 42 in contact with the applied adhesive 46 (at 108), and curing the adhesive 46 to form the composite structure 50 (at 110; also see FIG. 6).

As yet another alternative, the bonding surface 48 of the second substrate 42 may be plasma treated as well by scanning the plasma flume 12 over the bonding surface 48 (at 112; also see FIG. 7). The plasma treated bonding surfaces 44 and 48 of the first and second substrates 16 and 42 may then be bonded together with enhanced bonding strengths relative to untreated bonding surfaces. To bond the substrates together, the adhesive 46 is applied to the plasma treated bonding surface 44 of the first substrate 16 (at 106), the plasma treated bonding surface 48 of the second substrate 42 is placed in contact with the adhesive 46 applied to the first substrate 16 (at 114), and the adhesive 46 between the first and second substrates 16 and 42 is cured to provide the composite structure 50 (at 110).

The following examples are non-limiting and only illustrate exemplary implementations of the invention.

EXAMPLES

Water Contact Angle Measurements.

A 0-degree plasma nozzle was connected to a plasma treatment device having a Plasmatreat RD1004 plasma jet coupled to a Plasmatreat FG5001 generator. Compressed air (40-90 psi) and electricity were used to generate a plasma flume, and plasma treatment of a PEKK substrate was carried out by scanning the plasma flume over the substrate at speeds of up to 1000 inches/minute (about 42 centimeters/second) at various distances between the nozzle tip and the substrate surface. Significant reductions in the water contact angle of the PEKK substrate of up to 75% compared with the PEKK substrate with no plasma treatment were observed at scanning distances of about 1.3-2.0 centimeters. The reduced water contact angle correlates with higher surface energy and is therefore thought to predict a greater propensity for adhesion and bonding of the plasma treated substrate.

Bonding Measurements.

Consolidated PEKK and PEEK carbon fiber reinforced laminates were trimmed into 6 inch by 15 inch (15 cm by 38 cm) panels for atmospheric pressure plasma treatment. The thermoplastic panels were not solvent wiped before plasma treatment. A plasma treatment device having a Plasmatreat RD 1004 plasma jet coupled to a Plasmatreat FG5001 generator was used to generate plasma flumes from compressed air. Plasma treatment of the panels was executed using two different conditions: 1) using a rotating 17-degree nozzle operating at less than 0.50 inches/second (about 12.7 millimeters/second), and 2) using a non-rotating 0-degree nozzle operating at higher speeds due to the greater intensity of the plasma flume, of up to about 5.0 inches/second (about 13 centimeters/second). Plasma treatment involved scanning the entire surface area of one side of the panel. After plasma treatment, the plasma treated sides of the thermoplastic panels were cobonded to a green (uncured) epoxy thermoset resin using two different epoxy adhesives at a single cobond cure cycle. The resulting composites were trimmed into individual double cantilever beam (DCB) coupons and tested to measure the mechanical performance of the bonded composites. The panels treated with the 0-degree nozzle were shown to be essentially equivalent to the panels treated with the 17-degree nozzle in terms of mechanical performance, such as fracture toughness, but were processed more quickly. In one test, plasma treatment of the thermoplastic panels took 90 seconds to complete using the 0-degree nozzle, and 270 seconds to complete using the 17-degree nozzle.

INDUSTRIAL APPLICABILITY

The plasma treatment method disclosed herein uses a nozzle having an emanation angle of 5 degrees or less to provide an intense and focused plasma flume. The intense plasma flume increases the bonding propensity of substrates, but at reduced processing times (and increased efficiency) relative to more diffuse plasma flumes generated with nozzles having greater emanation angles. Thus, substrates that are typically difficult to bond due to their low surface energies may be activated for bonding more quickly. For example, using nozzles with an emanation angle of 0 degrees, thermoplastic substrates can be plasma treated at significantly reduced processing times relative to a nozzle with an emanation angle of 17 degrees, without compromising the mechanical performance of the resulting bonded structures. As thermoplastics are readily molded into shapes and configurations difficult to access with thermosets, the ability to activate thermoplastic substrates readily may increase the design space in various applications such as aerospace and automotive applications. Furthermore, due to the intensity of the plasma flume, solvent wiping steps for cleaning thermoplastic substrates prior to plasma treatment may be eliminated as the intense plasma flume cleans the substrate surface sufficiently. With thermoset substrates, the use of a peel ply for bonding activation is not needed, as the intense plasma activates the surface for bonding sufficiently on its own. Accordingly, waste may be reduced and processing efficiency may be increased with both thermoplastic and thermoset substrates.

What is claimed is:

1. A method for plasma treating a surface of a first substrate, comprising:
    generating a plasma flume using a plasma treatment device having a nozzle, the plasma flume emanating through a flume aperture of the nozzle at an emanation angle, the emanation angle being defined as an angle between a central axis of the nozzle and a central axis of the flume aperture, the emanation angle of the nozzle being about 5 degrees or less; and
    plasma treating the surface of the first substrate with the plasma flume by scanning the plasma flume over the surface of the first substrate, the first substrate being one of a consolidated thermoplastic material and a cured thermoset material.

2. The method of claim 1, wherein the plasma treating increases a propensity for bonding of the plasma treated surface of the first substrate relative to the surface prior to plasma treating.

3. The method of claim 2, wherein the emanation angle is about 2 degrees or less.

4. The method of claim 2, wherein the emanation angle is about 0 degrees.

5. The method of claim 2, wherein the substrate is a consolidated thermoplastic material.

6. The method of claim 2, wherein the substrate is a cured thermoset material.

7. The method of claim 1, wherein the scanning the plasma flume includes orienting the plasma flume normal to the surface.

8. The method of claim 4, wherein the plasma flume has a diameter of about 6.4 millimeters.

9. The method of claim 4, wherein a distance between a tip of the nozzle and the surface during the scanning ranges from about 1.2 centimeters to about 2.0 centimeters.

10. The method of claim 5, wherein the surface is not treated by solvent wiping prior to plasma treating the surface.

11. The method of claim 6, wherein the surface is activated for bonding with the plasma treating alone without use of a peel ply.

12. A method for bonding a first substrate to a second substrate, comprising:
    generating a plasma flume using a plasma treatment device having a nozzle, the plasma flume emanating through a flume aperture of the nozzle at an emanation angle, the emanation angle being defined as an angle between a central axis of the nozzle and a central axis of the flume aperture, the emanation angle being about 5 degrees or less;
    plasma treating a bonding surface of the first substrate by scanning the plasma flume over the bonding surface of the first substrate, the plasma treating increasing the propensity for bonding of the plasma treated surface relative to the surface prior to plasma treating;
    applying an adhesive to the plasma treated bonding surface of the first substrate;
    placing a bonding surface of the second substrate in contact with the adhesive applied to the first substrate; and
    curing the adhesive to bond the first substrate to the second substrate.

13. The method of claim 12, wherein the emanation angle is about 0 degrees.

14. The method of claim 12, wherein the first substrate is one or more of a consolidated thermoplastic material and a cured thermoset material.

15. The method of claim 12, wherein scanning the plasma flume includes orienting the plasma flume normal to the surface.

16. The method of claim 14, wherein the second substrate is one of a consolidated thermoplastic material, an uncured thermoset material, and a cured thermoset material.

17. The method of claim 15, wherein the second substrate is one of an uncured thermoset material and a cured thermoset material.

18. A method for forming a composite structure, comprising:
- generating a plasma flume through a flume aperture of a nozzle at an emanation angle being defined as an angle between a central axis of the nozzle and a central axis of the flume aperture, the emanation angle being about 5 degrees or less;
- plasma treating a bonding surface of a first substrate with the plasma flume by scanning the plasma flume over the bonding surface of the first substrate;
- plasma treating a bonding surface of a second substrate with the plasma flume by scanning the plasma flume over the bonding surface of the second substrate; and
- bonding the plasma treated bonding surfaces of the first and second substrates together to form the composite structure.

19. The method of claim 18, wherein bonding the first substrate to the second substrate comprises:
- applying an adhesive to the plasma treated bonding surface of the first substrate;
- placing the plasma treated bonding surface of the second substrate in contact with the adhesive applied to the first substrate; and
- curing the adhesive.

20. The method of claim 18, wherein the first substrate is one of a consolidated thermoplastic material and a cured thermoset material, and the second substrate is one of a consolidated thermoplastic material and a cured thermoset material.

* * * * *